(12) United States Patent
Saito

(10) Patent No.: US 8,224,515 B2
(45) Date of Patent: Jul. 17, 2012

(54) MOBILE BODY

(75) Inventor: Tomohiro Saito, Chiryu (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 758 days.

(21) Appl. No.: 12/280,050

(22) PCT Filed: Jul. 26, 2007

(86) PCT No.: PCT/JP2007/065106
§ 371 (c)(1),
(2), (4) Date: Aug. 20, 2008

(87) PCT Pub. No.: WO2008/032497
PCT Pub. Date: Mar. 20, 2008

(65) Prior Publication Data
US 2010/0228411 A1    Sep. 9, 2010

(30) Foreign Application Priority Data
Sep. 12, 2006  (JP) ................................. 2006-247146

(51) Int. Cl.
*B60L 9/00* (2006.01)
*B60L 11/00* (2006.01)
*G05D 1/00* (2006.01)
*G05D 3/00* (2006.01)
*G06F 7/00* (2006.01)
*G06F 17/00* (2006.01)

(52) U.S. Cl. ........................................................ 701/22

(58) Field of Classification Search ............... 180/65.31, 180/305; 320/101; 429/9, 428, 429; 318/400.12; 903/904; 701/22
See application file for complete search history.

(56) References Cited

U.S. PATENT DOCUMENTS

| | | | |
|---|---|---|---|
| 2005/0118472 A1* | 6/2005 | Yang et al. | 429/23 |
| 2005/0211478 A1* | 9/2005 | Sakuma et al. | 180/65.1 |
| 2007/0112496 A1* | 5/2007 | Ji | 701/70 |
| 2008/0195267 A1* | 8/2008 | Miranda et al. | 701/22 |
| 2010/0121515 A1* | 5/2010 | Izumi | 701/22 |
| 2011/0029172 A1* | 2/2011 | Kwon et al. | 701/22 |

FOREIGN PATENT DOCUMENTS

| | | |
|---|---|---|
| DE | 199 25 368 A1 | 12/2000 |
| DE | 10 2005 027 615 A1 | 2/2006 |
| JP | 09-231991 A | 9/1997 |
| JP | 2005-73475 A | 3/2005 |
| JP | 2005-276593 A | 10/2005 |
| JP | 2007-149450 A | 6/2007 |
| JP | 2007-151346 A | 6/2007 |

* cited by examiner

*Primary Examiner* — John Nguyen
*Assistant Examiner* — Michael Whalen
(74) *Attorney, Agent, or Firm* — Kenyon & Kenyon LLP

(57) ABSTRACT

The present invention has a theme of a mobile body capable of suppressing rapid acceleration along a downward slope at a time of start. The mobile body comprises a driving force generation device which generates a driving force of the mobile body; a power accumulation device capable of supplying a power to the driving force generation device; a fuel cell capable of supplying a power to the driving force generation device; and a control device which controls driving of the driving force generation device. The control device prohibits to start driving the driving force generation device by the power supply of the power accumulation device in a case where the mobile body is positioned on a downward slope when starting the mobile body.

10 Claims, 3 Drawing Sheets

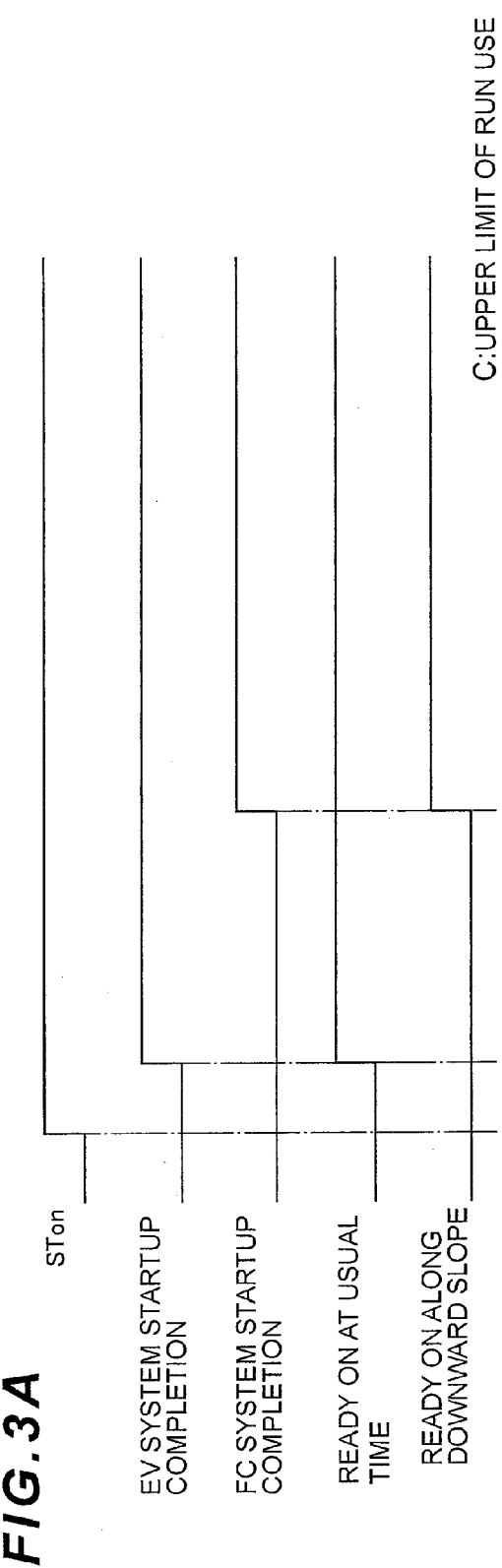
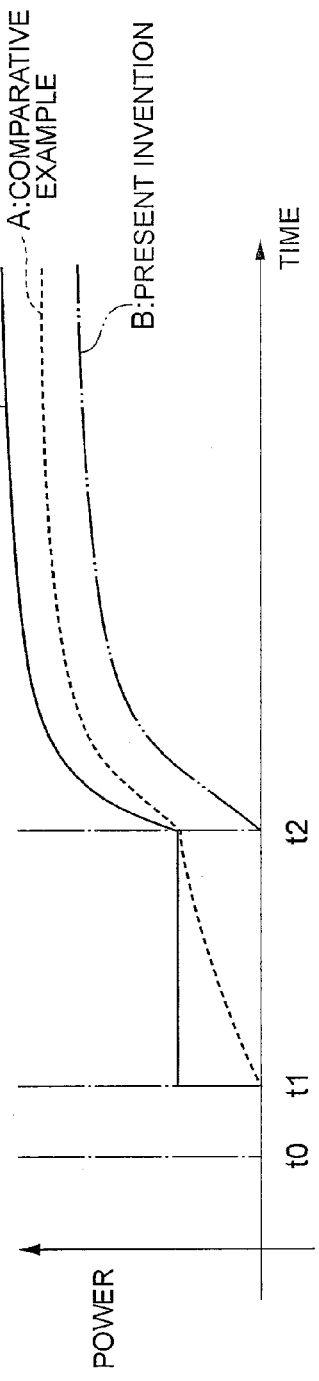
FIG.3A
FIG.3B

MOBILE BODY

This is a 371 national phase application of PCT/JP2007/065106 filed 26 Jul. 2007, which claims priority to Japanese Patent Application No. 2006-247146 filed 12 Sep. 2006, the contents of which are incorporated herein by reference.

TECHNICAL FIELD

The present invention relates to a mobile body such as a fuel cell car. More particularly, it relates to a mobile body including a power accumulation device and a fuel cell as supply devices of a power to a driving force generation device typified by a traction motor.

BACKGROUND ART

Heretofore, as a vehicle on which a fuel cell system is mounted, a vehicle is known in which a traction motor is driven by power supply from a secondary battery and a fuel cell (Japanese Patent Application Laid-Open No. 9-231991). In this vehicle, when starting the vehicle, the traction motor is driven by the power supply from the secondary battery only, until power generation of the fuel cell is stabilized. Then, after the power generation of the fuel cell is stabilized, the traction motor is driven using the fuel cell.

DISCLOSURE OF THE INVENTION

A vehicle sometimes stops on a slope. However, in Japanese Patent Application Laid-Open No. 9-231991, start control of the vehicle on the slope is not considered. Therefore, even when the vehicle is positioned on the downward slope, the only secondary battery starts driving the traction motor to start the vehicle, and then a power from the fuel cell is supplied to the traction motor. However, when a required torque of the traction motor is large, for example, at a time of the start, a torque of the traction motor rapidly increases at the moment when the generated power of the fuel cell is supplied to the traction motor. In this case, the vehicle might rapidly accelerate along the downward slope so that the vehicle dashes out.

An object of the present invention is to provide a mobile body which can suppress rapid acceleration along a downward slope at a time of start.

To achieve the above object, a mobile body of the present invention comprises a driving force generation device which generates a driving force of the mobile body, a power accumulation device and a fuel cell capable of supplying a power to the driving force generation device, and a control device which controls driving of the driving force generation device. The control device prohibits to start driving the driving force generation device by the power supply of the power accumulation device in a situation in which the mobile body is positioned on a downward slope when starting the mobile body.

In consequence, for example, after obtaining a state in which the power can be supplied to the driving force generation device from both the fuel cell and the power accumulation device, it is possible to start driving the driving force generation device. Accordingly, sudden rise of an output of the driving force generation device at the time of the start can be suppressed, and it can be inhibited that the mobile body rapidly accelerates along a downward slope at the time of the start.

Here, the power accumulation device is, for example, a chargeable/dischargeable secondary battery or a capacitor, but is not limited to this example. The driving force generation device is, for example, a traction motor, but is not limited to this example. The mobile body is, for example, a two-wheeled or four-wheeled car, a train, an airplane, a ship or a robot and is self-propellable, but a vehicle is preferable according to one aspect.

Preferably, in the above situation, the control device allows to start driving the driving force generation device after completion of startup of the fuel cell or simultaneously with the completion of the startup.

In consequence, while suppressing the rapid acceleration of the mobile body along the downward slope at the time of the start, the mobile body can be started in a short time. In this case, a power supply source which starts driving the driving force generation device may be either the power accumulation device or the fuel cell.

Preferably, the mobile body includes a first detection device for detecting tilt of the mobile body with respect to a road surface. Then, based on the first detection device, the control device may determine whether to prohibit or allow to start driving the driving force generation device by the power supply of the power accumulation device.

In consequence, in a case where the mobile body tilts comparatively largely, it can be prohibited to start driving the driving force generation device by the power supply of the power accumulation device. Therefore, the rapid acceleration of the mobile body along the downward slope at the time of the start can be suppressed. On the other hand, in a case where the mobile body is positioned on a usual road other than the slope, when the tilt of the mobile body is comparatively small in this manner, it can be allowed to start driving the driving force generation device by the power supply of the power accumulation device. Therefore, a start time of the mobile body can be reduced. Here, the first detection device is, for example, a G sensor (a forward and backward G sensor or a transverse G sensor) or a yaw sensor.

Preferably, the mobile body includes a second detection device for detecting that the mobile body starts along the downward slope in an ascending direction or a descending direction. Then, in a case where the second detection device detects that the mobile body starts along the slope in the descending direction, the control device may prohibit to start driving the driving force generation device by the power supply of the power accumulation device.

In consequence, the start of the mobile body can be controlled in consideration of a start direction of the mobile body along the downward slope. Accordingly, in a case where the vehicle starts in the ascending direction of the slope, the start can be controlled so that it is not uniformly prohibited to drive the driving force generation device.

BRIEF DESCRIPTION OF THE DRAWINGS

FIG. 3A is a timing chart showing control of the vehicle at a time of start; and FIG. 3B is a diagram corresponding to FIG. 3A and showing one of the examples of control according to the present invention and a comparative example regarding a relation between time and power when starting the vehicle.

BEST MODE FOR CARRYING OUT THE INVENTION

A fuel cell system according to a preferable embodiment of the present invention will hereinafter be described with reference to the accompanying drawing. Here, an example will be described in which the fuel cell system is mounted on a vehicle as a typical example of a self-propelled mobile body.

Figure 1:
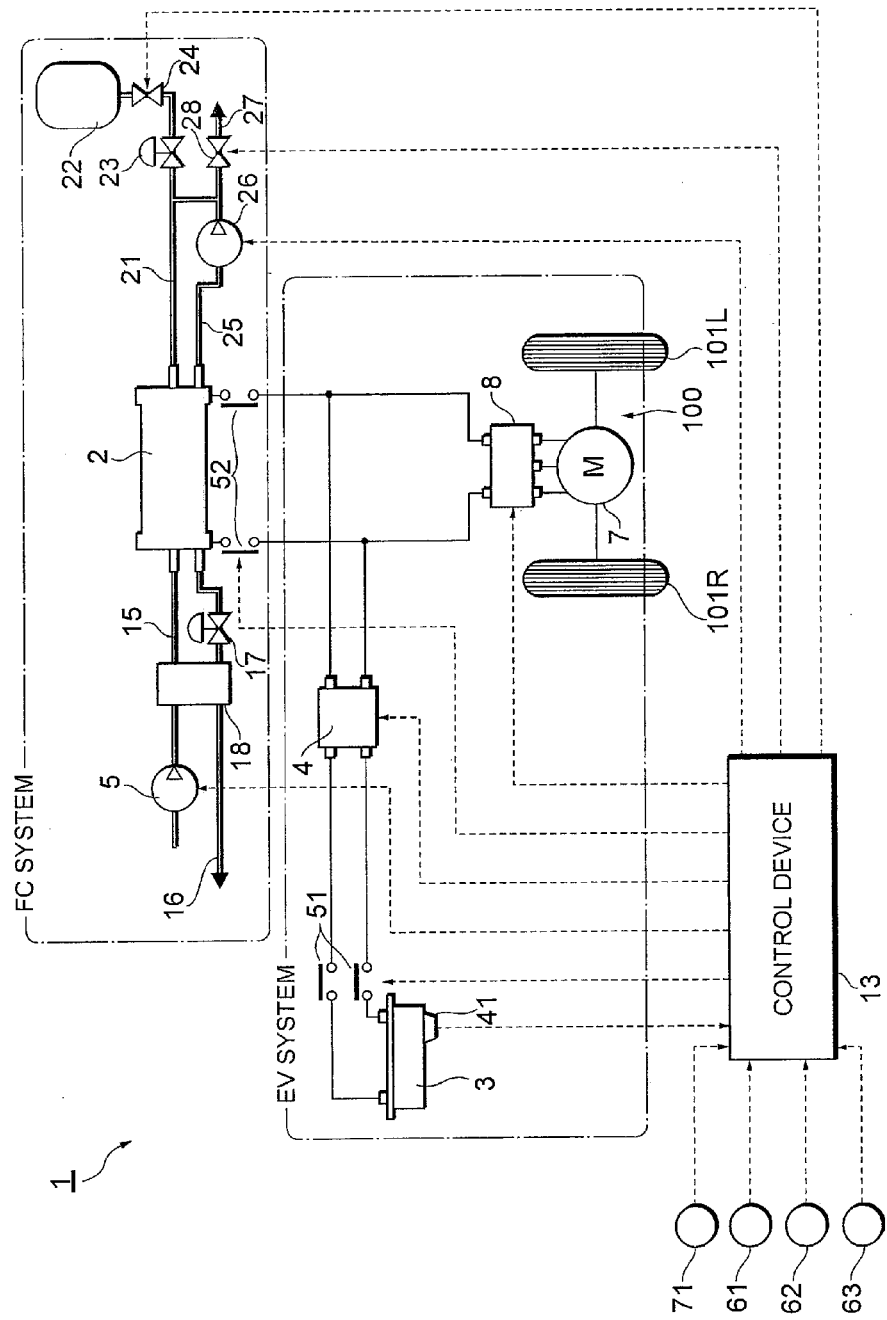
FIG. 1 is a constitution diagram schematically showing a fuel cell system mounted on a vehicle.

As shown in FIG. 1, a vehicle 100 runs using, as a driving force source, a traction motor 7 (a power generation device) connected to wheels 101L, 101R. A power source of the traction motor 7 is a fuel cell system 1 including a fuel cell 2 and a power accumulation device 3. A direct current output from the fuel cell system 1 is converted into a three-phase alternating current by an inverter 8 and supplied to the traction motor 7. At a time of braking of the vehicle 100, the traction motor 7 is driven by the wheels 101L, 101R, and the traction motor 7 functions as a power generator to generate the three-phase alternating current. This three-phase alternating current is converted into the direct current by the inverter 8 to charge the power accumulation device 3.

The traction motor 7 is an electric motor for obtaining an impulsive force of the vehicle run, and is constituted of, for example, a three-phase synchronous motor. A maximum output of the traction motor 7 is, for example, 80 kW. The traction motor 7 can be used as an in-wheel motor, and a two-wheeled or four-wheeled driving constitution can be employed. In this case, two or four inverters 8 are connected in parallel with an output terminal of the fuel cell 2, and the respective inverters 8 may be connected to the traction motor 7. It is to be noted that when a direct-current motor is used as the traction motor 7, the inverter 8 is not required.

The fuel cell system 1 includes the fuel cell 2, the power accumulation device 3, a high-voltage DC/DC converter 4, a control device 13 and the like. The power accumulation device 3 is connected in parallel with the fuel cell 2 via the high-voltage DC/DC converter 4. The high-voltage DC/DC converter 4 is connected between the power accumulation device 3 and the inverter 8.

The fuel cell 2 includes a stack structure in which a large number of single cells are laminated. There are various types of the fuel cell 2, for example, a phosphoric acid type and a solid oxide type. The fuel cell 2 of the present embodiment is constituted of a solid polymer electrolytic type which can start up at ordinary temperature and in which a startup time is comparatively short. A maximum output of the fuel cell 2 is, for example, 90 kW.

An oxide gas fed under pressure by an air compressor 5 flows through a supply path 15, and is supplied to an air electrode (a cathode) in the fuel cell 2. An oxide off-gas used in cell reaction of the fuel cell 2 flows through an off-gas channel 16 and is discharged outside. The off-gas channel 16 is provided with a pressure regulation valve 17 which regulates a pressure of the oxide gas to be supplied to the fuel cell 2, and a humidifier 18 for humidifying the oxide gas with the oxide off-gas.

A hydrogen gas as a fuel gas flows through a supply path 21, and is supplied to a hydrogen electrode (an anode) in the fuel cell 2. The hydrogen gas is supplied to the fuel cell 2 from, for example, a hydrogen storage source 22 such as a high-pressure hydrogen tank provided on an upstream side of the supply path 21 via a regulator 23. The supply path 21 is provided with a shutoff valve 24 which allows to supply the hydrogen gas of the hydrogen storage source 22 to the supply path 21 or which stops the supply. It is to be noted that the hydrogen gas generated by modifying a material such as alcohol or a compressed natural gas may be supplied to the fuel cell 2.

A hydrogen off-gas used in the cell reaction of the fuel cell 2 is discharged to an off-gas path 25, returned to the supply path 21 by a hydrogen pump 26 and supplied to the fuel cell 2 again. A discharge path 27 is branched and connected to the off-gas path 25. A purge valve 28 on the discharge path 27 appropriately opens during an operation of the fuel cell system 1, whereby impurities in the hydrogen off-gas are discharged together with the hydrogen off-gas to a downstream side of the discharge path 27. In consequence, a concentration of the impurities in the hydrogen off-gas in a hydrogen circulation line lowers, and a concentration of hydrogen in the hydrogen off-gas to be circulated and supplied can be raised.

The power accumulation device 3 is a chargeable/dischargeable secondary battery which functions as a high-voltage power accumulation device. The power accumulation device 3 is, for example, a nickel hydrogen cell or a lithium ion cell, but a capacitor other than the secondary battery may be used. A charge amount of the power accumulation device 3 is detected by an SOC sensor 41.

The power accumulation device 3 assists the power in a state in which an output power of the fuel cell 2 only is insufficient, for example, during acceleration transition or high-load operation of the vehicle 100. Moreover, when the operation of the fuel cell 2 is stopped or it is preferable from a viewpoint of efficiency to stop the operation, for example, during stop of the vehicle 100 or during low load run thereof, the vehicle 100 runs only with the power of the power accumulation device 3. A power capacity of the power accumulation device 3 can appropriately be set in accordance with run conditions of the vehicle 100, a run function such as a maximum speed, a vehicle weight or the like. A maximum output of the power accumulation device 3 is smaller than that of the fuel cell 2, and is, for example, 20 kW.

The high-voltage DC/DC converter 4 is a direct-current voltage converter. The high-voltage DC/DC converter 4 has a function of adjusting the direct-current voltage input from the power accumulation device 3 to output the voltage toward the inverter 8, and a function of adjusting the direct-current voltage input from the fuel cell 2 or the traction motor 7 to output the voltage to the power accumulation device 3. These functions of the high-voltage DC/DC converter 4 realize charging and discharging of the power accumulation device 3. An output voltage of the fuel cell 2 is controlled by the high-voltage DC/DC converter 4.

A relay 51 (first shutoff means) which can shut off the power supply from the power accumulation device 3 to the inverter 8 is provided between the high-voltage DC/DC converter 4 and the power accumulation device 3. A relay 52 (second shutoff means) which can shut off the power supply from the fuel cell 2 to the inverter 8 is provided between the high-voltage DC/DC converter 4 and the fuel cell 2.

Although not shown, various auxiliary machines for use in the operation of the fuel cell 2 are connected between the high-voltage DC/DC converter 4 and the fuel cell 2 via an inverter. In the present embodiment, the auxiliary machines correspond to the air compressor 5, the hydrogen pump 26 and the like. During a usual operation of the fuel cell 2, the power of the fuel cell 2 does not flow through the high-voltage DC/DC converter 4, and is supplied to the auxiliary machines (5 and 26). On the other hand, during the operation stop of the fuel cell 2 and in the beginning of the start, the power of the power accumulation device 3 is supplied to the auxiliary machines (5 and 26) via the high-voltage DC/DC converter 4.

The control device 13 is constituted as a microcomputer including therein a CPU, an ROM and an RAM. The CPU executes desired calculation according to a control program to perform various processing and control such as start control of the vehicle 100 described later. The ROM stores the control program and control data to be processed by the CPU. The RAM is used as various operation areas mainly for control processing.

The control device 13 is connected to the SOC sensor 41 and various pressure and temperature sensors for use in a gas system of the oxide gas and the hydrogen gas and a cooling system. Moreover, the control device 13 is connected to an accelerator pedal position sensor 61 which detects an accelerator open degree of the vehicle 100, and a forward and backward G sensor 62 and a transverse G sensor 63 mounted on the vehicle 100, in addition to a snaking angle sensor and a vehicle speed sensor.

The forward and backward G sensor 62 detects the tilt of the vehicle 100 in a forward and backward direction (a proceeding direction) with respect to the road surface. The transverse G sensor 63 detects the tilt of the vehicle 100 in a left and right direction (a vehicle width direction) with respect to the road surface. It is preferable to mount the forward and backward G sensor 62 at a front part or a rear part of the vehicle 100 and mount the transverse G sensor 63 at a side part of the vehicle 100 in order that the tilt of the vehicle 100 can precisely be detected. It is to be noted that as the first detection device which detects the tilt angle of the vehicle 100 with respect to the road surface, the forward and backward G sensor 62, the transverse G sensor 63, an acceleration degree sensor (so-called G sensor), a tilt angle sensor (a gradient sensor) and a yaw sensor are broadly known, and it is preferable to use at least one of them.

The control device 13 receives output signals of the above sensors to calculate a system required power (e.g., a sum of a vehicle run power and an auxiliary machine power) to control operations of various devices in the system 1. Specifically, the control device 13 obtains the system required power based on the accelerator open degree, the vehicle speed or the like, and executes control so that the output power of the fuel cell 2 matches a target power.

Here, the vehicle run power means a required power of the traction motor 7, and the auxiliary machine power means a total of powers required for the operations of the various auxiliary machines in the fuel cell system 1. The required power of the traction motor 7 is calculated by the control device 13 based on the accelerator open degree, the vehicle speed and the like. This required power is calculated by obtaining a power to be output from the traction motor 7 from a product of a target rotation number and a target torque of the traction motor 7, and dividing this power by an operation efficiency of the traction motor 7, that is, a ratio of the power to be output per power consumption. It is to be noted that when the traction motor 7 is operated as a power generator to perform regenerative braking, a target torque becomes a negative value, and therefore the required power becomes a negative value.

After calculating the required power of the traction motor 7, the control device 13 calculates the auxiliary machine power corresponding to the required power of the traction motor 7. Then, the control device 13 controls the operation of the high-voltage DC/DC converter 4 so as to supply the system required power, and adjusts an operation point (an output voltage, an output current) of the fuel cell 2. At this time, the control device 13 controls switching of the inverter 8 to output the three-phase alternating current corresponding to the vehicle run power to the traction motor 7. Moreover, the control device 13 adjusts rotation numbers of motors (not shown) of the air compressor 5 and the hydrogen pump 26, whereby the fuel cell 2 controls supply of the oxide gas and the hydrogen gas in accordance with the target power and the cooling system (not shown) controls the temperature of the fuel cell 2.

Here, as shown in FIG. 1, a control system of the fuel cell system 1 can be divided into functions of an FC system including the fuel cell 2 and an EV system including the power accumulation device 3. The FC system functions mainly as a power source of a run power. The EV system functions mainly as a power source for efficiently using the output power of the fuel cell 2. In the FC system, the relay 52 is closed, so that the power of the fuel cell 2 can be supplied to the traction motor 7. In the EV system, the relay 51 is closed, so that the power of the power accumulation device 3 can be supplied to the traction motor 7.

Figure 2:
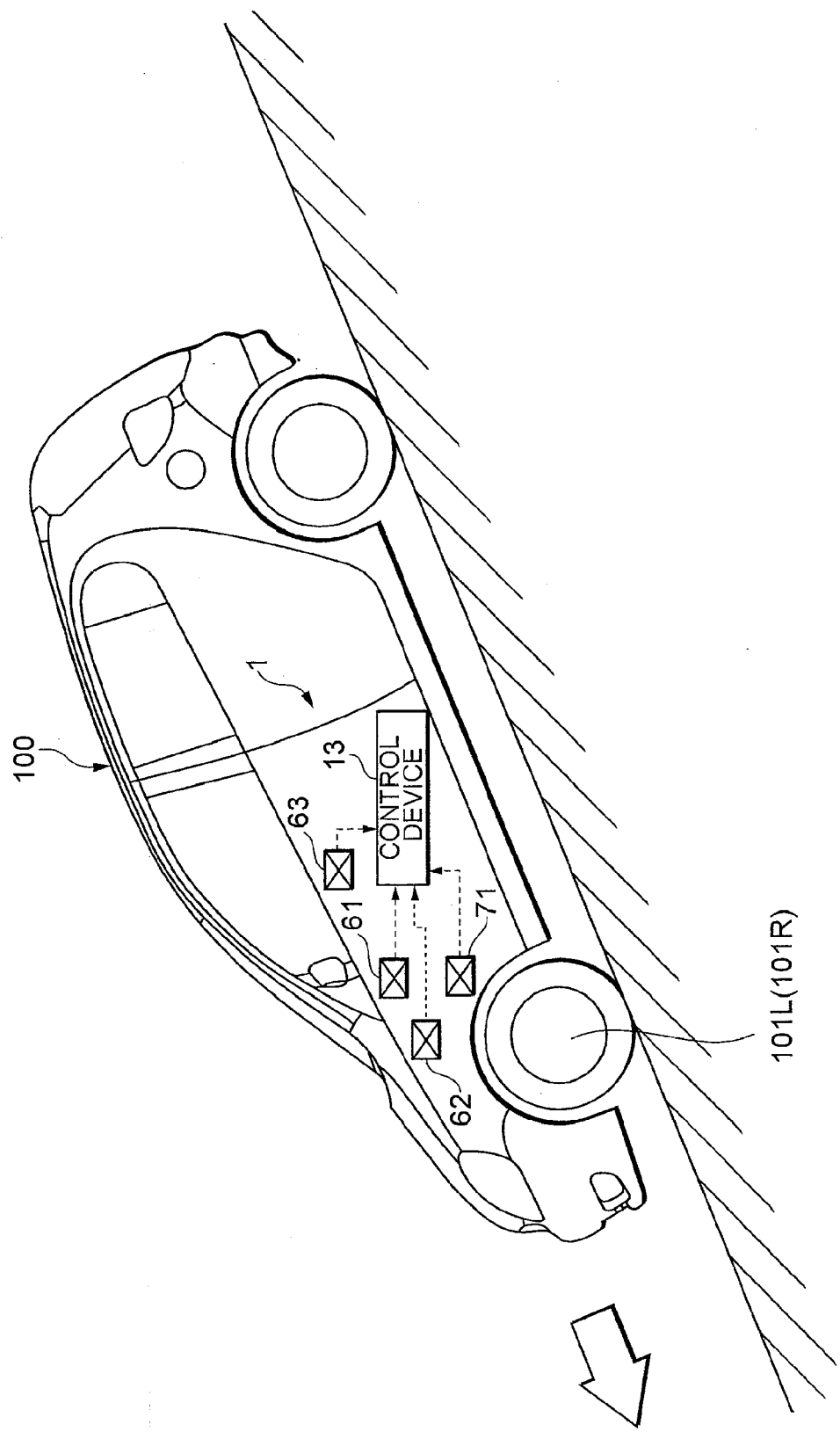
FIG. 2 is a side view of the vehicle on a downward slope.

In the above constitution, when starting the vehicle 100, a timing to start driving the traction motor 7 is changed in a case where the vehicle 100 is positioned on a usual road surface (a road surface which does not have any tilt or which has small tilt) and a case where the vehicle 100 is positioned on a downward slope 200 as shown in FIG. 2. The start control of this vehicle 100 will be described with reference to FIGS. 3A and B.

It is to be noted that FIG. 2 shows a part of the constitution in the fuel cell system 1, such as the control device 13 and the detection devices (the accelerator pedal position sensor 61, the forward and backward G sensor 62 and the transverse G sensor 63).

FIG. 3A is a timing chart showing control when starting the vehicle 100, and FIG. 3B is a graph showing a relation between a power usable in the vehicle run and time in a case where "ready on" is executed. Here, "ready on" means to allow the driving of the traction motor 7, that is, to allow the run start (start) of the vehicle 100.

The fuel cell system 1 is stopped until STon is performed (till a timing t0) as shown in FIG. 3A. That is, the relays 51, 52 are opened, respectively, and in the EV system and the FC system, the power supply to the traction motor 7 is shut off.

Here, STon is an abbreviation of "START ON", and means that startup of the fuel cell system 1 is initiated. That is, at the timing of STon, the fuel cell system 1 initiates the startup so that the power of the fuel cell system 1 is used in the vehicle 100. An operation of STon is performed by an operation necessary for starting up the fuel cell system 1 to start the vehicle 100, for example, by operating a starter switch by a driver of the vehicle 100.

When STon is performed to obtain a predetermined timing t1, "EV system startup completed". The "EV system startup completed" means a state in which the relay 51 of the EV system is closed and the traction motor 7 can be driven by the power of the power accumulation device 3.

From the timing 1 to a timing t2 after an elapse of a predetermined time t1, "FC system startup completed" results. The "FC system startup completed" means a state in which the relay 52 of the FC system is closed and the traction motor 7 can be driven by the power of the fuel cell 2. In more detail, "FC system startup completed" is a state in which system check of the fuel cell system 1 is completed, the fuel cell 2 has a state of completion of startup, in other words, a state in which the power can stably be generated, and the traction motor 7 can be driven by the generated power. It is to be noted that the system check is to check whether or not there is a trouble in constituting elements (various sensors, valves, pumps, etc.) of the fuel cell system 1.

Therefore, when STon is performed, the power accumulation device 3 is brought into a state in which the device can supply the power to the traction motor 7, before the fuel cell 2.

As shown in FIG. 3B, "A: Comparative Example" illustrates one example of a power for use in running of the vehicle 100 along the downward slope 200 in a case where "ready on" is executed at the timing t1 of "EV system startup completed. In the drawing, "B: Present Invention" illustrates one example of a power for use in the running of the vehicle 100 along the downward slope 200 in a case where "ready on" is executed at the timing t2 of "FC system startup completed. Moreover, "C: Upper limit of run use" illustrates an upper limit of the power usable in the running of the vehicle 100 in a case where "ready on" is executed at the timing t1.

As shown in "C: Upper limit of run use" of FIG. 3B, an upper limit of the power from the timing t1 to the timing t2 corresponds to the maximum output of the power accumulation device 3, and is 25 kW according to the above example. An upper limit of the power after the timing t2 corresponds to a value obtained by adding the output of the fuel cell 2 to the maximum output of the power accumulation device 3, and gradually increases with time.

A timing at which "ready on" is set is determined in accordance with a tilt state of the vehicle 100. Specifically, the timing of "ready on" is set based on an acceleration sensor and a tilt angle sensor concerning the tilt of the vehicle 100 with respect to the road surface.

In the present embodiment, in a case where the forward and backward G sensor 62 detects that the vehicle 100 is positioned on the usual road surface other than the downward slope 200, the control device 13 sets "ready on" to the timing t1. For example, in a case where it is detected that the vehicle 100 is positioned on the usual road surface which has little gradient or scarcely has the gradient, "ready on" is set to the timing t1.

Under this setting, it is allowed to start driving the traction motor 7 by the power supply from the power accumulation device 3 only, and the starting of the driving is executed to start the vehicle 100. Afterward (after the timing t2), the power supply to the traction motor 7 switches from the output of the power accumulation device 3 to the output of the fuel cell 2. It is to be noted that when passing acceleration is started from a constant state, the power of the power accumulation device 3 is supplied to the traction motor 7 again to assist the fuel cell 2.

On the other hand, in a case where the forward and backward G sensor 62 detects that the vehicle 100 is positioned on the downward slope 200, the control device 13 sets "ready on" to the timing t2. For example, in a case where a front part of the vehicle 100 tilts forwards and downwards and hence it is detected that a forward tilt angle of the vehicle 100 is larger than a predetermined threshold value, "ready on" is set to the timing t2.

Under this setting, at the timing t2, the driving of the traction motor 7 is started by the power supply of the fuel cell 2 or the power accumulation device 3, and the vehicle 100 starts. That is, at the time of the start in a case where the vehicle 100 is present on the downward slope 200, it is prohibited to start driving the traction motor 7 by the power supply of the power accumulation device 3.

Supposing that as in "A: Comparative Example", when the vehicle 100 is started along the downward slope 200 and "ready on" is executed simultaneously with "EV system startup completed", a torque of the traction motor 7 rapidly increases at the timing t2. Owing to this rapid increase of the torque, the vehicle 100 might rapidly accelerate along the downward slope 200.

On the other hand, as in "B: Present Invention", when the vehicle 100 is started along the downward slope 200, "ready on" is executed simultaneously with "FC system startup completed", it can be inhibited that the torque of the traction motor 7 rapidly increases. Therefore, the rapid acceleration of the vehicle 100 along the downward slope 200 can be suppressed, and the vehicle 100 can smoothly be started.

As described above, according to the vehicle 100 of the present embodiment, a timing to start driving the traction motor 7 is changed in accordance with the tilt state of the vehicle 100 when starting the vehicle. Therefore, when the vehicle 100 is positioned on the downward slope 200, the rapid acceleration of the vehicle 100 at the time of the start can be suppressed. Moreover, as described above, the forward and backward G sensor 62 can detect whether or not the vehicle 100 is positioned on the downward slope 200, and a forward tilt state of the vehicle 100 before started can appropriately be confirmed.

Furthermore, simultaneously with "FC system startup completed", that is, simultaneously with a state in which the fuel cell 2 can stably generate the power, the traction motor 7 can start to be driven. In consequence, while suppressing the rapid acceleration of the vehicle 100 along the downward slope 200 at the time of the start, the vehicle 100 can be started in a short time. Moreover, when the vehicle 100 is positioned on the usual road surface other than the downward slope 200, the driving of the traction motor 7 can be started by the power supply of the power accumulation device 3. Therefore, at such a usual time, a starting time of the vehicle 100 can be reduced.

In another embodiment, a timing to start driving the traction motor 7 may not be simultaneous with "FC system startup completed", but needs to be after "FC system startup completed".

Next, a modification of the start control of the vehicle 100 will be described.

Even when the vehicle 100 is positioned on the downward slope 200, it is preferable to set the timing of "ready on" in consideration of whether the vehicle 100 starts in an ascending direction or a descending direction along the downward slope 200. For example, as shown in FIGS. 1 and 2, it is preferable to set the timing of "ready on" in consideration of the detection result of a shift position sensor 71 which detects a shift position of the vehicle 100. The shift position sensor 71 detects shift positions such as parking (P), reverse (R), neutral (N) and drive (D) to output the position to the control device 13.

As one specific example, there is considered a case where the forward and backward G sensor 62 detects that the forward tilt angle of the vehicle 100 positioned on the downward slope 200 exceeds a threshold value and the shift position sensor 71 detects that the shift position of the vehicle 100 is the drive (D). In this case, the vehicle 100 starts in the descending direction along the downward slope 200, and therefore the control device 13 may set "ready on" at the timing t2 or later.

On the other hand, there is considered a case where when starting the vehicle 100, the shift position sensor 71 detects that the shift position is the reverse (R). In this case, the vehicle 100 starts so as to run backward in the ascending direction along the downward slope 200, and it is therefore preferable that the control device 13 varies the timing of the "ready on" based on the forward tilt angle of the vehicle 100.

For example, when a value of the forward tilt angle of the vehicle 100 exceeds the threshold value, the control device 13 may set "ready on" to the timing t2. In this case, the driving force of the traction motor 7 can be secured, and the vehicle 100 which ascends an upward slope can substantially be inhibited from crawling backwards. On the other hand, in a case where the value of the forward tilt angle of the vehicle 100 is the threshold value or less, an influence of the backward crawling of the vehicle 100 is supposed to be small. Therefore, in this case, the control device 13 may set "ready on" to the timing t1.

INDUSTRIAL APPLICABILITY

The above-mentioned fuel cell system 1 can be mounted on a mobile body other than a two-wheeled or four-wheeled car, for example, a train, an airplane, a ship or a robot.

The invention claimed is:

1. A mobile body comprising:
a driving force generation device which generates a driving force of the mobile body;
a power accumulation device configured to supply a power to the driving force generation device;
a fuel cell configured to supply a power to the driving force generation device; and
a control device which controls driving of the driving force generation device,
the control device prohibiting to start driving the driving force generation device by the power accumulation device until the fuel cell is brought into a state in which the fuel cell can supply the power to the driving force generation device in a case where the mobile body is positioned on a downward slope so that at least a portion of a front of the mobile body is facing downward when starting the mobile body,
wherein when the mobile body is started, the power accumulation device is brought into a state in which the power accumulation device can supply the power to the driving force generation device before completion of the start-up of the fuel cell.

2. The mobile body according to claim 1, wherein the control device allows to start driving the driving force generation device after completion of startup of the fuel cell in the case where the mobile body is positioned on the downward slope when starting the mobile body.

3. The mobile body according to claim 1, wherein the control device allows to start driving the driving force generation device simultaneously with completion of startup of the fuel cell in the case where the mobile body is positioned on the downward slope when starting the mobile body.

4. The mobile body according to claim 1, wherein the control device starts driving the driving force generation device by the power accumulation device in a case where the mobile body is positioned on a usual road surface which has a small gradient or which scarcely has the gradient when starting the mobile body.

5. The mobile body according to claim 4, wherein the control device switches a power supply to the driving force generation device from the power accumulation device to the fuel cell.

6. The mobile body according to claim 1, further comprising a first detection device for detecting a tilt of the mobile body with respect to a road surface,
wherein based on the first detection device, the control device determines whether to prohibit or allow to start driving the driving force generation device by the power accumulation device.

7. The mobile body according to claim 6, wherein the first detection device detects the tilt of the mobile body in a proceeding direction with respect to the road surface.

8. The mobile body according to claim 1, further comprising a second detection device for detecting that the mobile body starts along the downward slope in an ascending direction or a descending direction,
wherein when the second detection device detects that the mobile body starts along the slope in the descending direction, the control device prohibits to start driving the driving force generation device by the power accumulation device.

9. The mobile body according to claim 1, which is a vehicle.

10. A mobile body comprising:
a driving force generation device which generates a driving force of the mobile body;
a power accumulation device configured to supply a power to the driving force generation device;
a fuel cell configured to supply a power to the driving force generation device; and
a control device which controls driving of the driving force generation device,
the control device prohibiting to start driving the driving force generation device by the power accumulation device until the fuel cell is brought into a state in which the fuel cell can supply the power to the driving force generation device in a case where the mobile body is positioned on a downward slope so that at least a portion of a front of the mobile body is facing downward when starting the mobile body,
wherein the control device allows to start driving the driving force generation device after completion of startup or simultaneously with completion of startup of the fuel cell in the case where the mobile body is positioned on the downward slope when starting the mobile body, and
wherein when the mobile body is started, the power accumulation device is brought into a state in which the power accumulation device can supply the power to the driving force generation device before completion of the start-up of the fuel cell.

* * * * *